(12) United States Patent
Knox

(10) Patent No.: US 7,416,167 B1
(45) Date of Patent: Aug. 26, 2008

(54) WINCH REMOVABLY MOUNTED ON VEHICLE SIDE RAILS

(75) Inventor: Howard Thomas Knox, Independence, KY (US)

(73) Assignee: Ancra International, LLC, Hawthorne, CA (US)

( * ) Notice: Subject to any disclaimer, the term of this patent is extended or adjusted under 35 U.S.C. 154(b) by 0 days.

(21) Appl. No.: 11/906,820

(22) Filed: Oct. 3, 2007

(51) Int. Cl.
    *B21F 9/00* (2006.01)
(52) U.S. Cl. .................. 254/223; 24/69 ST; 24/70 ST; 410/100; 410/103; 410/104
(58) Field of Classification Search ................. 254/222, 254/223, 243; 24/69 ST, 70 ST; 410/100, 410/103, 104
    See application file for complete search history.

(56) References Cited

U.S. PATENT DOCUMENTS

| | | | | |
|---|---|---|---|---|
| 3,697,045 A * | 10/1972 | Farley | ........................ | 410/103 |
| 4,367,993 A * | 1/1983 | Meigs | ........................ | 410/103 |
| 5,186,586 A * | 2/1993 | Stephenson, Jr. | ............ | 410/100 |
| 5,433,565 A | 7/1995 | Chan | | |
| 5,490,749 A | 2/1996 | Arbues | | |
| 6,015,250 A * | 1/2000 | Walsh et al. | ................ | 410/100 |
| 6,250,861 B1 | 6/2001 | Whitehead | | |
| 6,527,487 B2 * | 3/2003 | Adams | ........................ | 410/104 |
| 6,612,793 B2 * | 9/2003 | Coslovi et al. | ............... | 410/100 |
| 6,742,972 B2 * | 6/2004 | Brunet | ........................ | 410/103 |
| 6,939,095 B1 * | 9/2005 | Hugg | ........................ | 410/102 |
| 7,160,069 B2 * | 1/2007 | Adams | ........................ | 410/104 |
| 2006/0081823 A1 * | 4/2006 | Ruan | ........................ | 254/218 |

* cited by examiner

*Primary Examiner*—Emmanuel M Marcelo
(74) *Attorney, Agent, or Firm*—Edward A. Sokolski

(57) ABSTRACT

A winch assembly is designed so that it can be slidably supported on the side rail of a vehicle. The winch assembly has side walls and a top plate. Slots are formed between the top plate and the side walls. A first bar runs between the side walls at substantially the same elevation as the top plate. A second bar runs between the side walls at an elevation below that of the first bar. A space is formed between the top plate and the first and second bars. The vehicle has a side rail running there around on which the winch assembly is supported. The side rail has a U-shaped bottom piece and a U-shaped top piece which run around the vehicle side walls. A cross member runs between the opposite sides of the cargo compartment The side frame has a U-shaped bottom piece with an arm extending there from, this arm being fitted into a slot in the deck of the vehicle located between the deck and the cross member. The side frame has a U-shaped top piece which fits between the top plate of the winch and the sides of the winch. The winch assembly is thus slidably yet firmly supported on the floor of the vehicle for ready removal for repair and reinstallation.

6 Claims, 4 Drawing Sheets

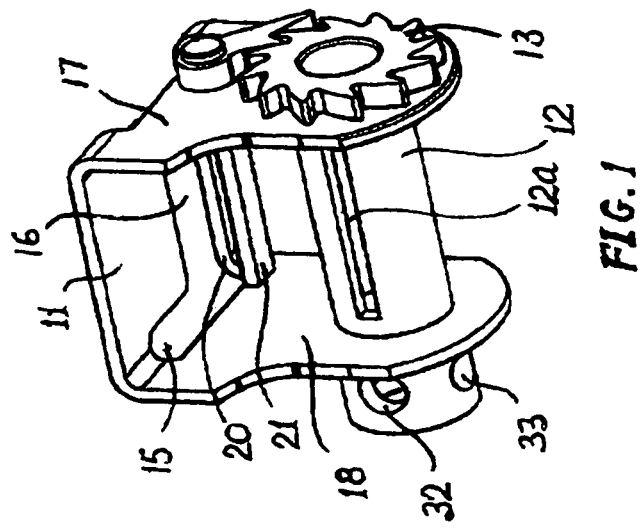
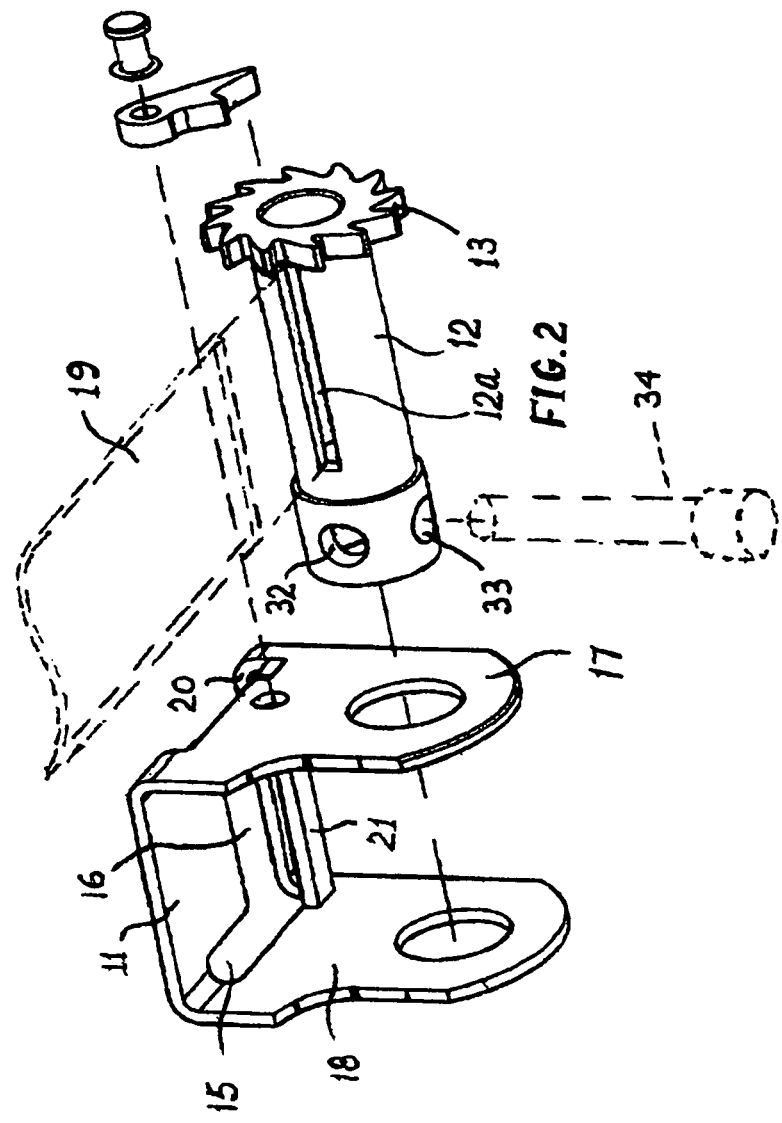

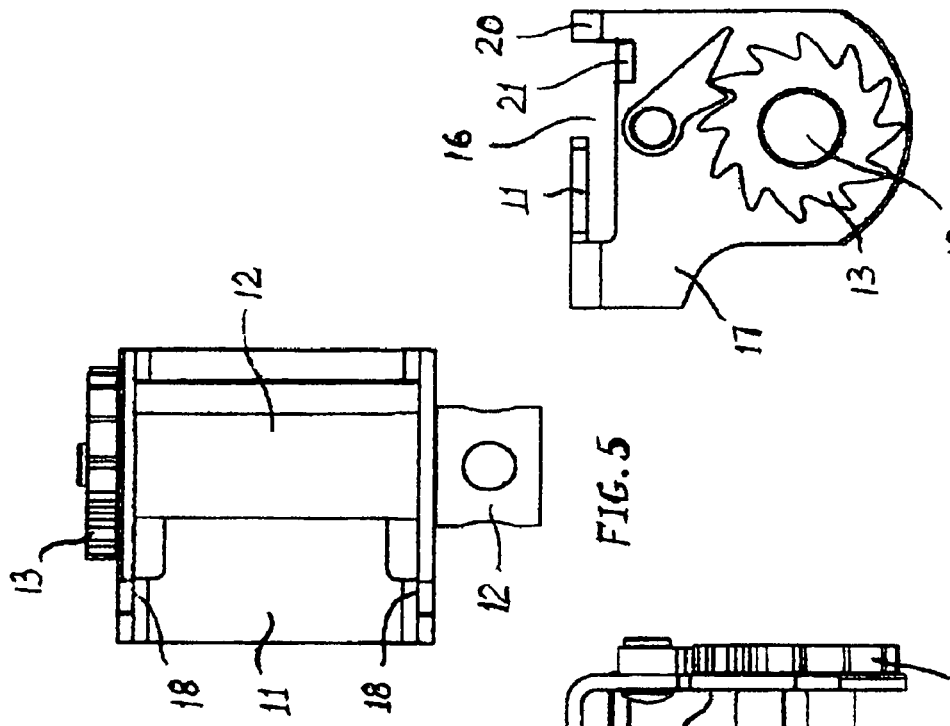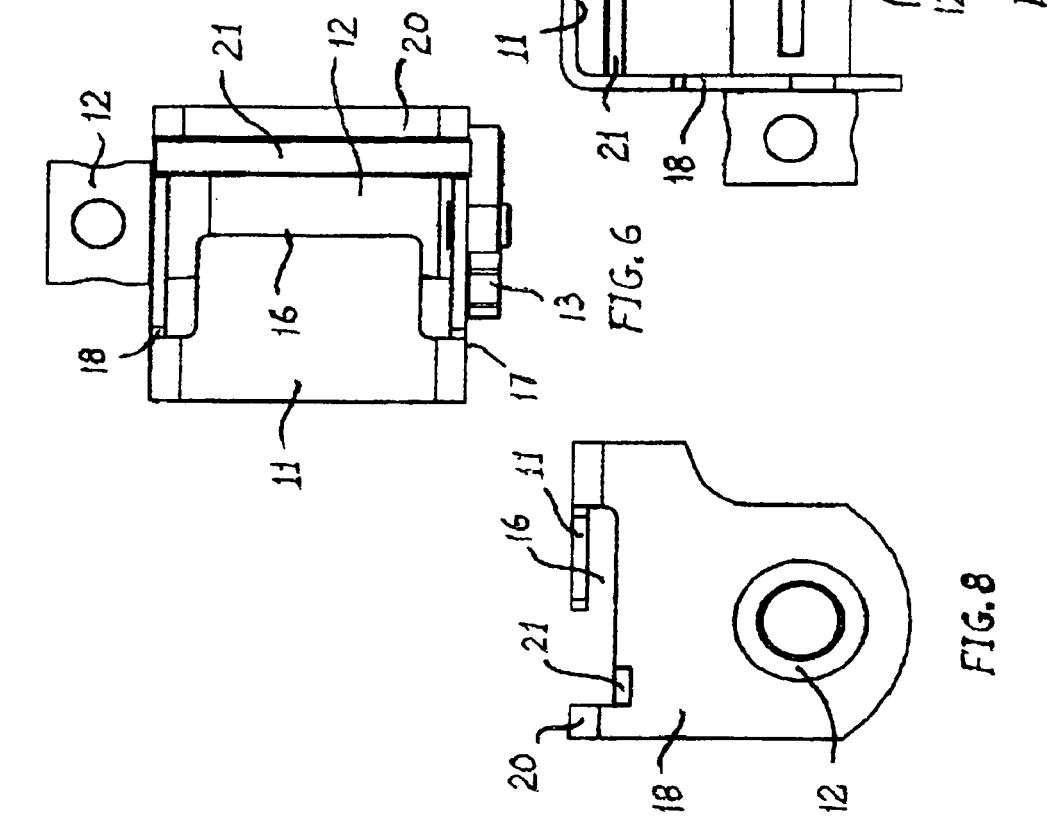

WINCH REMOVABLY MOUNTED ON VEHICLE SIDE RAILS

FIELD OF THE INVENTION

This invention relates to the mounting of a winch on the side rails of a vehicle and more particularly to such a mounting device, which is removably supported on the side rail elements of a vehicle.

BACKGROUND OF THE INVENTION

Winches employed for securing loads on the floor of a vehicle are generally attached to the side rail structure of the vehicle by welding or bolting. This approach has disadvantages of the heavier weight required for the welded portion of the winch as well as contact stress in this portion. Further, if the winch needs to be replaced, the removal of the welded portion involves damage to the side rail. In addition, the cost of assembly is increased with a welding or bolting attachment. Such prior art attachment systems are described in U.S. Pat. No. 5,433,565 issued Jul. 18, 1995 to Chan and U.S. Pat. No. 5,490,749 issued Feb. 13, 1996 to Arbues.

SUMMARY OF THE INVENTION

The shortcomings of the prior art are overcome in the present invention by providing a mounting structure, which securely fits onto a conventional side rail of a vehicle by slidable yet firm engagement. The vehicle side rail has a cross member which runs between the opposite sides thereof and a side rail, which runs along the vehicle sidewall. The side rail has a U-shaped bottom piece with an extension arm extending there from and fitted into a slot in the vehicle deck between this deck and the cross member. The side rail has a U-shaped top piece, which has an extension arm, which fits into a slot formed between a top plate of the winch and the sides of the winch. The outer arm of the U-shaped top piece of the vehicle side rail fits between a first bar running between the opposing walls of the winch assembly, across the top thereof, and a second bar running between the opposing walls of the winch assembly below the top thereof. The winch is thereby held firmly in position between the cross member on the floor of the vehicle and the vehicle deck, yet readily repositioned along the length of the side rail.

DESCRIPTION OF THE DRAWINGS

FIG. 1 is a perspective view of a preferred embodiment of the device of the invention;

FIG. 2 is an exploded view of the preferred embodiment;

FIG. 4 is a side elevational view of the preferred embodiment;

FIG. 5 is a bottom plan view of the preferred embodiment;

FIG. 6 is a top plan view of the preferred embodiment;

FIG. 7 is an end elevational view of the preferred embodiment;

FIG. 8 is a side elevational view of the preferred embodiment taken from the side opposite to that of FIG. 4.

DESCRIPTION OF THE DEVICE OF THE INVENTION

Figure 3:
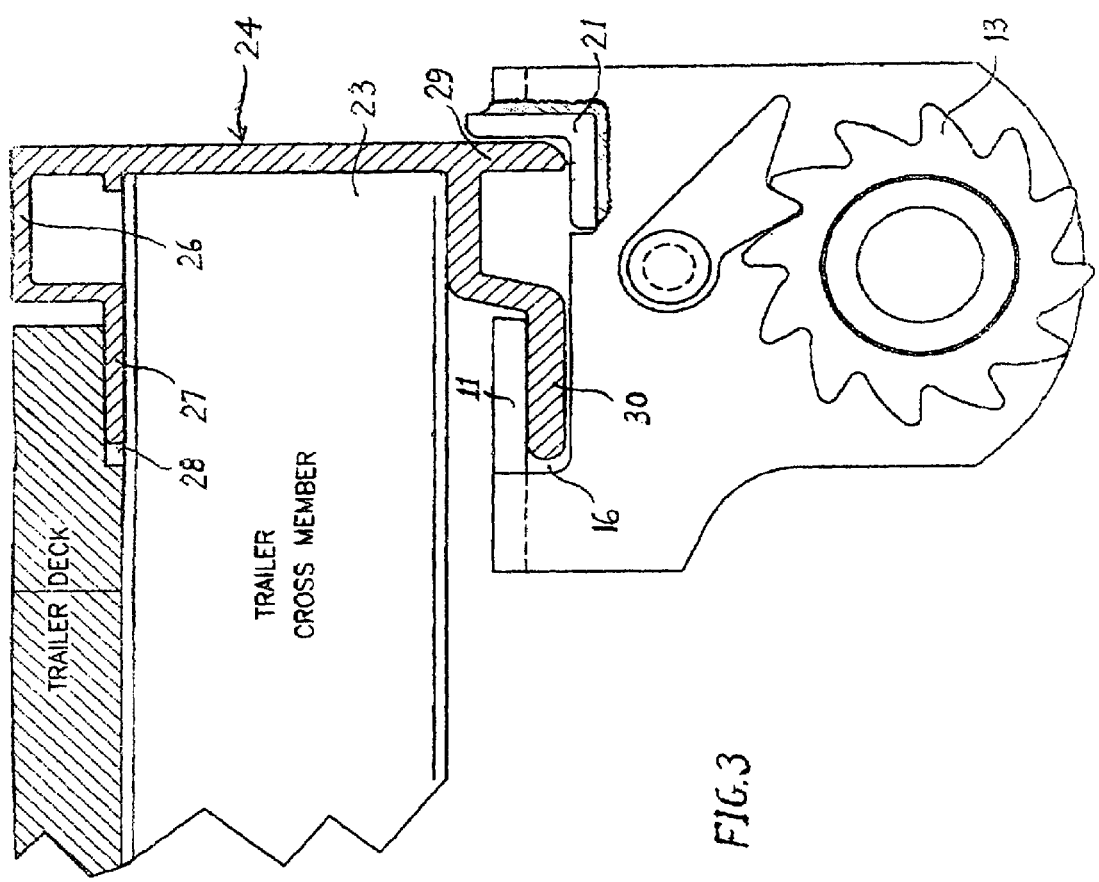
FIG. 3 is a side elevational view, partly in cross section showing the preferred embodiment attached to the vehicle side frame.

Referring now to the FIGS, a preferred embodiment of the invention is illustrated. The winch is conventional in its basic form, having a ratchet wheel 13 and a drum 12 with a slot 12a formed therein. A strap 19 is inserted in the slot and wound around the drum, the strap being employed to retain cargo in place. The winch has a top plate 11 with slots 15 and 16 formed between plate 11 and sidewalls 17 and 18. A first bar 20 runs between the sidewalls 17 and 18 across the top of the winch. A second bar 21 runs between the walls 17 and 18 above bar 20. As shown in FIG. 2, the end of the drum opposite ratchet wheel 13 has apertures 32 and 33 formed there through, which are substantially at right angles to each other and through which a bar 34 is fitted in adjusting the position of the winch.

Referring now to FIG. 3, the attachment of the device of the invention to the trailer deck is illustrated. The vehicle has a cross member 23 running between opposite sides of the deck. The side rail 24 of the vehicle runs along the side of the vehicle deck. The side rail 24 has a U-shaped top end piece 26 with an extension arm 27 extending there from. Arm 27 is fitted into slot 28 formed in the vehicle deck between the deck and cross member 23. Side rail 24 has a U-shaped bottom end piece 29, which is held in place by bar 21. Bar 21 is fixedly attached to side wall 17 by welding or other suitable means. Extension plate 30 extends from bottom end piece 29 and fits into slots 15 and 16 between plate 11 and side walls 17 and 18.

Figure 9:
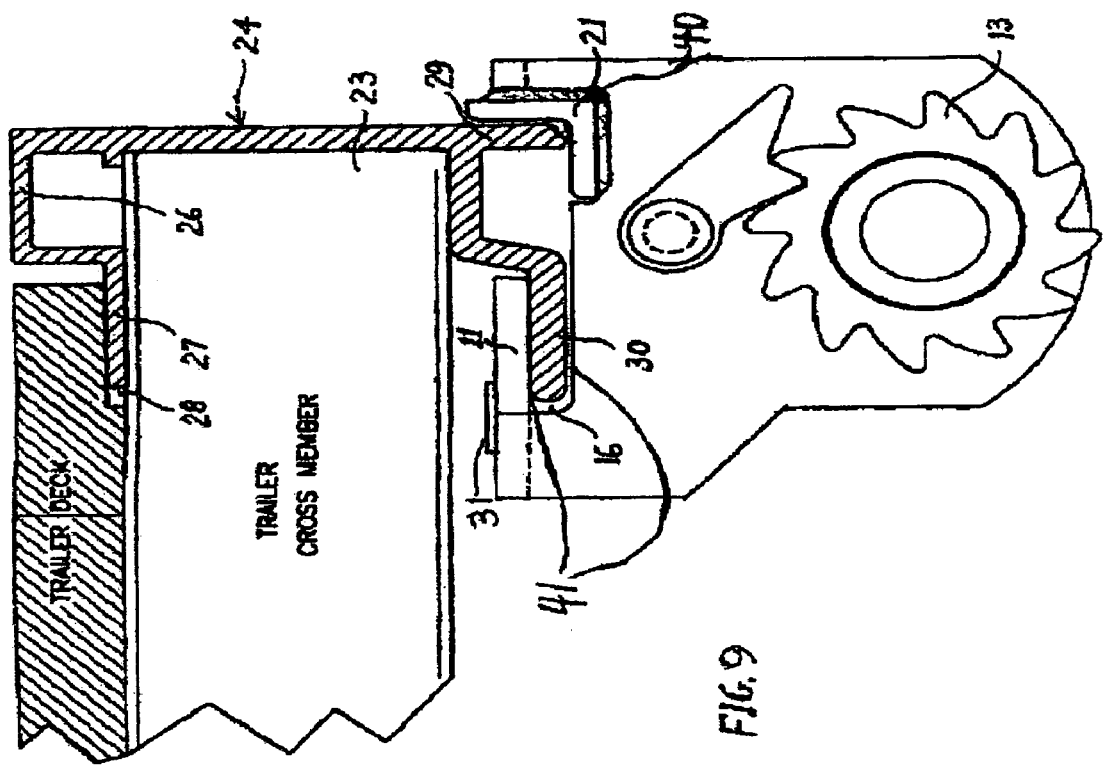
FIG. 9 is a side elevational view partly in cross section of a second embodiment of the invention shown attached to the vehicle side frame.

Referring now to FIG. 9, a second embodiment of the structure for attaching the trailer deck is illustrated. This structure is basically the same as that of the first embodiment, shown in FIG. 3 except for the following differences. First, an additional plate 31 is attached to cross plate 11 to strengthen the structure. Further, cross bar 21 is formed in an angular shape and welded in place, as indicated at 40 to more firmly hold the winch assembly to the side rail. In addition, the sides of the frame at 41 and cross plate 11 are formed as a unitary assembly and the slots and openings for the side rail are formed when this flat piece is bent 90 degrees at each side.

Thus, the winch of the invention fits slidably yet in firm retention on the side rail of the vehicle.

While the invention is described and illustrated in detail, it is to be understood that this is intended by way of illustration and example only and not by way of limitation, the spirit and scope of the invention being set forth in the following claims.

I claim:

1. A winch assembly for mounting on a side frame attached to a deck of a vehicle compartment comprising:
   a frame having side walls substantially opposite each other;
   a top plate attached to said side walls and extending inwardly towards a center of said assembly;
   slots formed between said top plates and said side walls for use in retaining a strap;
   a first bar running between said side walls, said bar having substantially the same elevation as said top plate; and
   a second bar running between said side walls, said second bar having an elevation below that of said first bar; and
   there being a lateral space between said first bar and said top plate;
   said side frame having an extension plate extending there from, said plate being slidably fitted between said top plate and a surface of said winch assembly.

2. The winch assembly of claim 1 wherein said side frame has a U-shaped piece extending there from, an arm of said U-shaped piece being held in place by the second bar.

3. The winch assembly of claim 1 wherein said side walls are substantially parallel to each other.

4. The winch assembly of claim 3 wherein said winch is mounted between said side walls.

5. A winch assembly for slidably mounting on a side frame of a vehicle, said side frame being attached to a deck of said vehicle, said side frame having U-shaped top and bottom pieces and an arm extending from each of said U-shaped pieces, said top piece being slidably attached to the vehicle deck, said winch assembly comprising:

side walls substantially parallel to each other;

a top plate attached to said side walls and extending inwardly towards a center of the assembly;

slots formed between said top plate and said side walls for use in retaining a strap; and a first bar running between said side walls at substantially the same elevation as said top plate;

there being a lateral space between said first bar and said top plate; wherein the arm extends from the bottom U-shaped piece of said side frame being fitted beneath said top plate.

6. The winch assembly of claim 5 and further including a second bar running between said side plates, said second bar being at an elevation below that of said first bar.

* * * * *